United States Patent [19]

Louzos

[11] 4,333,996

[45] Jun. 8, 1982

[54] SOLID STATE CELL IN WHICH AN INERT NONCONDUCTIVE MATERIAL IS DISPERSED IN THE CATHODE

[75] Inventor: Demetrios V. Louzos, Rocky River, Ohio

[73] Assignee: Union Carbide Corporation, Danbury, Conn.

[21] Appl. No.: 191,521

[22] Filed: Sep. 29, 1980

[51] Int. Cl.³ .............................................. H01M 6/18
[52] U.S. Cl. .................................... 429/191; 429/213
[58] Field of Search ......................... 429/191, 213, 232

[56] References Cited

U.S. PATENT DOCUMENTS

| | | | |
|---|---|---|---|
| 3,660,163 | 5/1972 | Moser ............................... | 136/83 R |
| 3,660,164 | 5/1972 | Hermann et al. ................. | 136/83 R |
| 3,713,897 | 1/1973 | Liang .................................. | 136/153 |
| 4,049,890 | 9/1977 | Schneider ........................... | 429/181 |
| 4,148,976 | 4/1979 | Sekido et al. ....................... | 429/191 |
| 4,182,798 | 1/1980 | Skarsted ............................. | 429/213 |
| 4,243,732 | 1/1981 | Powers et al. ...................... | 429/213 |

FOREIGN PATENT DOCUMENTS 55-157863  12/1980  Japan .................................. 429/191

*Primary Examiner*—Donald L. Walton
*Attorney, Agent, or Firm*—Cornelius F. O'Brien

[57] ABSTRACT

A solid state cell employing a charge transfer complex cathode having dispersed therein particles of a chemically inert, high surface area, electrically nonconductive material so as to effectively prevent the cell's impedance from substantially increasing during discharge thereby resulting in a greater discharge rate capability.

8 Claims, No Drawings

SOLID STATE CELL IN WHICH AN INERT NONCONDUCTIVE MATERIAL IS DISPERSED IN THE CATHODE

FIELD OF THE INVENTION

The invention relates to a solid state cell employing a charge transfer complex cathode in which particles of a chemically inert, high surface area, electrically nonconductive material are dispersed in the cathode so as to effectively prevent the impedance of the cell from substantially increasing during discharge thereby resulting in a greater discharge rate capability.

BACKGROUND OF THE INVENTION

Ionic conductivity is usually associated with the flow of ions through an aqueous solution of metallic salts. In the vast majority of practical uses of ionic conductors, e.g., as the electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of the liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Gutman et al, J. Electrochem. Soc., 114, 323 (1967) discloses solid state cells utilizing cathodes of electronically conducting charge transfer complexes and anodes of selected divalent metals. U.S. Pat. No. 3,660,163 discloses solid state lithium-iodine primary cells employing a lithium anode, a solid state lithium halide electrolyte and a conductive cathode of organic materials, such as polycyclic aromatic compounds, organic polymers, heterocyclic nitrogen-containing compounds, and the like, and iodine. U.S. Pat. No. 3,660,164 discloses solid state cells utilizing as a cathode a charge transfer complex in which the acceptor component is the halogen and the donor component is an organic compound, typically aromatic or heterocyclic.

Although various solid state cells employing charge transfer complex cathodes have been recited in the art, it has been observed that during discharge the current and voltage drop relatively early thus limiting their use in some applications. It is, therefore, an object of the present invention to provide a solid state cell in which the impedance rise remains relatively low during discharge thereby resulting in the current and voltage remaining relatively high.

Another object of the present invention is to provide a solid state cell employing a cathode comprising a charge transfer complex in which particles of a chemically inert, high surface area, electrically nonconductive material are dispersed in the cathode.

Another object of the present invention is to provide a lithium/organic charge transfer complex solid state cell operable such that the discharge product formed will be more effectively extended within the cell so as to result in a lower rise in the cell's impedance during discharge, thereby permitting a greater discharge rate capability.

The foregoing and additional objects will become more fully apparent from the following description.

SUMMARY OF THE INVENTION

The invention relates to a solid state cell employing an anode, a solid electrolyte and a charge transfer complex cathode in which the complex is the reaction product of an organic electron donor and an electron acceptor of at least one halogen; the improvement wherein a minor amount of at least one chemically inert, high surface area, electrically nonconductive material in particulate form is dispersed in the cathode.

As used herein, high surface area shall mean particulate forms of material of a size of 50 m$^2$/g or more, preferably more than 200 m$^2$/g. It is believed that, for example, in the case of a lithium solid state cell, the lithium ions migrate on the surface of the additive. Thus a greater surface area provides a more extensive distribution of the lithium ion, resulting in a greater reaction area over which the discharge product is formed.

As used herein, a minor amount shall mean less than 50 percent by weight of the cathode. Preferably, an amount of the chemically inert, electrically nonconductive material between about 5% and about 30% by weight of the cathode, and more preferably between about 15% and 20% by weight of the cathode, should be dispersed in the cathode.

Charge transfer complexes are a well-known class of materials that have two components—one as an electron donor, the other as an electron acceptor—which form weakly bonded complexes that exhibit electronic conductivity higher than either component. High energy density solid state cell systems have been favorably received for use in various applications, such as the heart pacer batteries, requiring low discharge currents. However, in devices requiring higher current power sources, the solid state charge transfer complex cell systems have sometimes proved to be inadequate. It is believed that this is due to the forming of a high-resistance layer at the cathode-anode interface by the discharge product of the cell. For example, in a lithium/iodine solid state cell a high resistance layer of lithium halide (LiI) is believed to be formed during discharge which effectively increases the cell's resistance and lowers the cell's discharge rate capability. To overcome this negative characteristic, the present invention is directed to the dispersion of a high surface area, chemically inert, electrically nonconductive material in the cathode. The presence of this chemically inert, high surface area, electrically nonconductive material in the cathode is believed to effectively extend the area of formation of the high resistance discharge product formed during the operation of the cell. This results in the substantial elimination or the effective reduction of the thickness of the high resistance layer of the discharge product at the geometrically planar cathode-electrolyte interface. This high resistance layer usually results in a low discharge rate capability. It has been observed that the reaction depth, that is, the penetration of the discharge product into the cathode can be greatly increased using the teachings of this invention. By increasing the reaction depth for the cell during its functional mode, a continuous high current and voltage output can be obtained.

Suitable chemically inert, high surface area, electrically nonconductive materials for this invention include alumina ($Al_2O_3$), silica ($SiO_2$), titania ($TiO_2$) and mixtures thereof. The principal criteria of the material is that it be chemically inert, electrically nonconductive in the cell environment and have a high surface area.

The amount of the chemically inert, high surface area, electrically nonconductive material to be dispersed in the cathode can vary between about 5% and about 30% by weight of the cathode, and preferably between about 15% and about 20%. An amount above 30% would displace too much of the active cathodic material of the cell thereby greatly decreasing its output capacity. An amount below 5% by weight may not effectively extend the area for the formation of the reaction product and thereby would not effectively increase the current and voltage output.

The particulate chemically inert, high surface area, electrically nonconductive material could be physically mixed with the cathode materials, followed by compression of the mixture to form a cathode having dispersed particles of the material.

Suitable organic electron doners for use in this invention are poly-2-vinylpyridine (P2-VP), mesophase pitch, poly-(N-vinylpyrrolidone), anthracene, naphthalene and other heterocyclic and polynuclear aromatic entities. A detailed description for producing mesophase pitch can be found in U.S. Pat. Nos. 4,005,183, 4,017,327 and 4,026,788, and in U.S. application Ser. No. 838,963 now U.S. Pat. No. 4,209,500 filed on Oct. 3, 1977 in the name of Stephen Chivastick. Mesophase pitch for use in solid state cell systems is disclosed in U.S. application Ser. No. 052,846 filed June 28, 1979 now U.S. Pat. No. 4,243,732. All of these references are incorporated herein by reference.

Suitable electron acceptors for this invention would be a halogen such as iodine, bromine or chlorine, a mixture of two or more halogens or a compound (interhalogen) of two or more halogens.

Preferably, the acceptor component such as iodine or bromine should range between about 50 percent to about 97 percent by weight of the total charge transfer complex and more preferably between about 80 percent and 90 percent by weight.

Anode materials suitable for use with the cathodes of this invention include lithium, silver, sodium, potassium, rubidium, magnesium and calcium. The preferred anode material is lithium.

Solid electrolytes for use in this invention would include lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide and sodium bromide. The preferred solid electrolytes for use in this invention are lithium iodide and tetrasilver potassium tetraiodide cyanide.

As disclosed in U.S. Pat. No. 3,660,163, in a lithium anode cell, lithium iodide can be formed in situ by contacting the lithium anode with the iodine-containing cathode surface whereupon the lithium will react with the iodine in the cathode to form a lithium iodide electrolyte layer that will contact both the anode and the cathode. Alternately, the lithium iodide could be formed by reacting lithium and iodine and then applying the lithium iodide as a coating on the surface of the anode or cathode.

Preferably, cell systems using the cathode of this invention would be as follows:

| Cathode | Anode | Electrolyte |
|---|---|---|
| Poly-2-Vinyl-pyridine . iodine complex | lithium | lithium iodide |
| Poly-2-Vinyl-pyridine . bromine complex | lithium | lithium bromide |

EXAMPLE I

A 0.457 inch diameter button cell (Sample A) was constructed as follows. A mesophase pitch/iodine charge transfer complex was prepared by grinding the mesophase pitch and iodine components followed by drying them using phosphorus pentoxide for a week in an argon dry box. Thereafter, the mesophase pitch and iodine were blended together using a 20% by weight mesophase pitch and 80% by weight iodine mixture and then sealed in an evacuated tube whereupon it was heated at 200° C. for 16 hours. The resulting charge transfer complex was assembled in a nickel-plated cold-rolled steel container. A lithium anode strip was placed in a cover which was then assembled along with a gasket on top of the container in a conventional manner such that the surface of the anode made contact with the surface of the cathode. The electrolyte, lithium iodide, was formed in situ by the reaction of the lithium in the anode and the iodine in the cathode. A second cell (Sample B) was prepared in the same manner except that the cathode mix contained 20% by weight $Al_2O_3$, 72.7% by weight $I_2$ and 7.3% by weight mesophase. The $Al_2O_3$ was dried over phosphorus pentoxide prior to being mixed with the other components. The two cells were continuously discharged across a 1 meg-ohm load at room temperature over an extended period of time. The voltage and impedance observed with time are shown in Table 1. As evident from the data obtained, the cell of this invention (Sample B) exhibited higher voltage readings and lower impedance readings with time over the cell (Sample A) of the prior art.

TABLE 1

| Sample A | | | Sample B | | |
|---|---|---|---|---|---|
| Time (days) | Voltage (volts) | Impedance (ohms × $10^3$) | Time (days) | Voltage (volts) | Impedance (ohms × $10^3$) |
| 75 | 2.49 | 52.0 | 52 | 2.47 | 13.5 |
| 101 | 2.37 | 89.0 | 72 | 2.43 | 16.0 |
| 151 | 2.18 | 150.0 | 153 | 2.32 | 21.0 |
| 272 | 1.76 | 234.0 | 274 | 2.34 | 37.0 |

EXAMPLE II

Two similar cells were produced as in Example I with Sample C being the same as Sample A and Sample D being the same as Sample B except 20% by weight $SiO_2$ was used in place of the 20% by weight $Al_2O_3$ in the cathode. Again, the $SiO_2$ was dried over phosphorus pentoxide prior to its mixture with the other cathode components. The voltage and impedance observed with time are shown in Table 2. As evident from the data obtained, the cell of this invention (Sample D) exhibited higher voltage readings and lower impedance readings with time than the cell (Sample C) of the prior art.

TABLE 2

| Sample C | | | Sample D | | |
|---|---|---|---|---|---|
| Time (days) | Voltage (volts) | Impedance (ohms × 10³) | Time (days) | Voltage (volts) | Impedance (ohm × 10³) |
| 75 | 2.49 | 52.0 | 100 | 2.63 | 13.5 |
| 101 | 2.37 | 89.0 | 120 | 2.50 | 17.7 |
| 151 | 2.18 | 150 | 178 | 2.43 | 22.6 |
| 272 | 1.75 | 234 | 297 | 2.35 | 52.0 |

It should be understood that the foregoing disclosure relates to preferred embodiments of the invention and it is intended to cover all changes and modifications of the invention which do not depart from the spirit and scope of the appended claims.

What is claimed is:

1. A solid state cell comprising an anode, a solid electrolyte and a charge transfer complex cathode in which the complex is the reaction product of an organic electron donor selected from the group consisting of poly-2-vinyl-pyridine, mesophase pitch, poly(N-vinyl-pyrrolidone), anthracene and naphthalene and an electron acceptor of at least one halogen; the improvement wherein a minimum amount of at least one chemically inert, high surface area, electrically nonconductive material in particulate form is dispersed in the cathode.

2. The solid state cell of claim 1 wherein the chemically inert, high surface area, electrically nonconductive material is added in an amount between about 5% by weight of the cathode and about 30% by weight of the cathode.

3. The solid state cell of claim 1 wherein the chemically inert, high surface area, electrically nonconductive material is added in an amount between about 15% by weight of the cathode and 20% by weight of the cathode.

4. The solid state cell of claim 1 wherein the chemically inert, high surface area, electrically nonconductive material is selected from the group consisting of alumina, silica, titania and mixtures thereof.

5. The solid state cell of claim 1, 2, 3 or 4 wherein the solid electrolyte is selected from the group consisting of lithium iodide, and lithium bromide; and the anode is selected from the group consisting of lithium, sodium, potassium, rubidium, magnesium and calcium.

6. The solid state cell of claim 1, 2, 3 or 4 wherein the electron acceptor is iodine or bromine; the electron donor is mesophase pitch, poly-2-vinylpyridine or poly(N-vinylpyrrolidone); the solid electrolyte is lithium iodide or lithium bromide; the anode is lithium and the chemically inert, high surface area, electrically nonconductive material is alumina or silica.

7. The solid state cell of claim 1, 3, 4 or 5 wherein the electron acceptor is iodine; the electron donor is poly-2-vinylpyridine; the solid electrolyte is lithium iodide; the anode is lithium and the chemically inert, high surface area, electrically nonconductive material is alumina.

8. The solid state cell of claim 1, 3, 4 or 5 wherein the electron acceptor is iodine; the electron donor is poly-2-vinylpyridine; the solid electrolyte is lithium iodide; the anode is lithium and the chemically inert, high surface area, electrically nonconductive material is silica.

* * * * *